(12) United States Patent
Dobrenko (10) Patent No.: US 6,252,784 B1
(45) Date of Patent: Jun. 26, 2001

(54) POWER AMPLIFIER WITH FEEDBACK (75) Inventor: Dimitry Dobrenko, Raanana (IL)

(73) Assignee: ECI Telecom Ltd, Petach Tikva (IL)

( * ) Notice: Subject to any disclaimer, the term of this patent is extended or adjusted under 35 U.S.C. 154(b) by 0 days.

(21) Appl. No.: 09/521,960

(22) Filed: Mar. 9, 2000

(30) Foreign Application Priority Data

Jul. 26, 1999 (IL) ........................................................ 131117

(51) Int. Cl.[7] ............................ H03M 3/335; H02H 7/122
(52) U.S. Cl. ............................... 363/21.12; 363/21.14; 363/21.18; 363/56
(58) Field of Search ................................ 363/20, 21, 40, 363/41, 55, 56, 95, 97, 131, 21.12, 21.14, 21.18; 323/901

(56) References Cited

U.S. PATENT DOCUMENTS

| 4,152,546 | * | 5/1979 | Stewart | 363/19 |
|---|---|---|---|---|
| 4,671,271 | * | 6/1987 | Rosenbaum et al. | 363/60 |
| 4,866,587 | * | 9/1989 | Wadlington | 363/16 |
| 5,229,929 | | 7/1993 | Shimizu et al. | 363/98 |
| 5,307,407 | | 4/1994 | Wendt et al. | 379/418 |
| 5,440,262 | * | 8/1995 | Lum et al. | 327/544 |
| 5,600,713 | | 2/1997 | Chen | 379/375 |
| 5,828,558 | * | 10/1998 | Korcharz et al. | 363/20 |
| 5,917,714 | * | 6/1999 | Ogawa | 363/20 |
| 6,049,471 | * | 4/2000 | Korcharz et al. | 363/20 |
| 6,088,243 | * | 7/2000 | Shin | 363/21 |

* cited by examiner

*Primary Examiner*—Peter S. Wong
*Assistant Examiner*—Bao Q. Vu
(74) *Attorney, Agent, or Firm*—Browdy & Neimark (57) ABSTRACT

A device for generating an electrical signal of a required form, preferably a sine wave suitable for a ringer, comprising an amplifier for producing an output signal of a required form, a power supply generator for supplying a power supply voltage to the amplifier, and a circuit for producing a first feedback signal to control the power supply voltage based on the output signal. Additionally, the amplifier provides comparison of a reference input signal with a second feedback signal formed from the output signal.

16 Claims, 6 Drawing Sheets

POWER AMPLIFIER WITH FEEDBACK

FIELD AND BACKGROUND OF THE INVENTION

The present invention relates to an apparatus for amplifying a signal, preferably to obtain a sine wave which is suitable for a ringer. More particularly, the invention relates to a low cost, minimal power loss and self-adjustable power amplifier.

In many telephony applications, including fixed wireless access and pair gain systems, it is necessary to generate a ringer voltage with a sinusoidal wave form. Typically the sine wave has a voltage amplitude of between 40 volts RMS (Root Mean Square) and 75 volts RMS with a DC offset. The sine wave frequency is generally 20, 25 or 50 Hertz.

In designing a sine wave generator, key considerations include low cost with standard parts, minimal power loss, and ability of generator to meet specified requirements under varying load and input voltage conditions. Feedback is a preferred method of ensuring correct output in many applications including sine wave generation. Shimizu (U.S. Pat. No. 5,229,929) demonstrates the use of feedback for purposes other than sine wave output generation. Output peak current correction is performed using a feedback signal which indicates the portions of the output waveform that are outside a predetermined range of amplitude.

Figure 1:
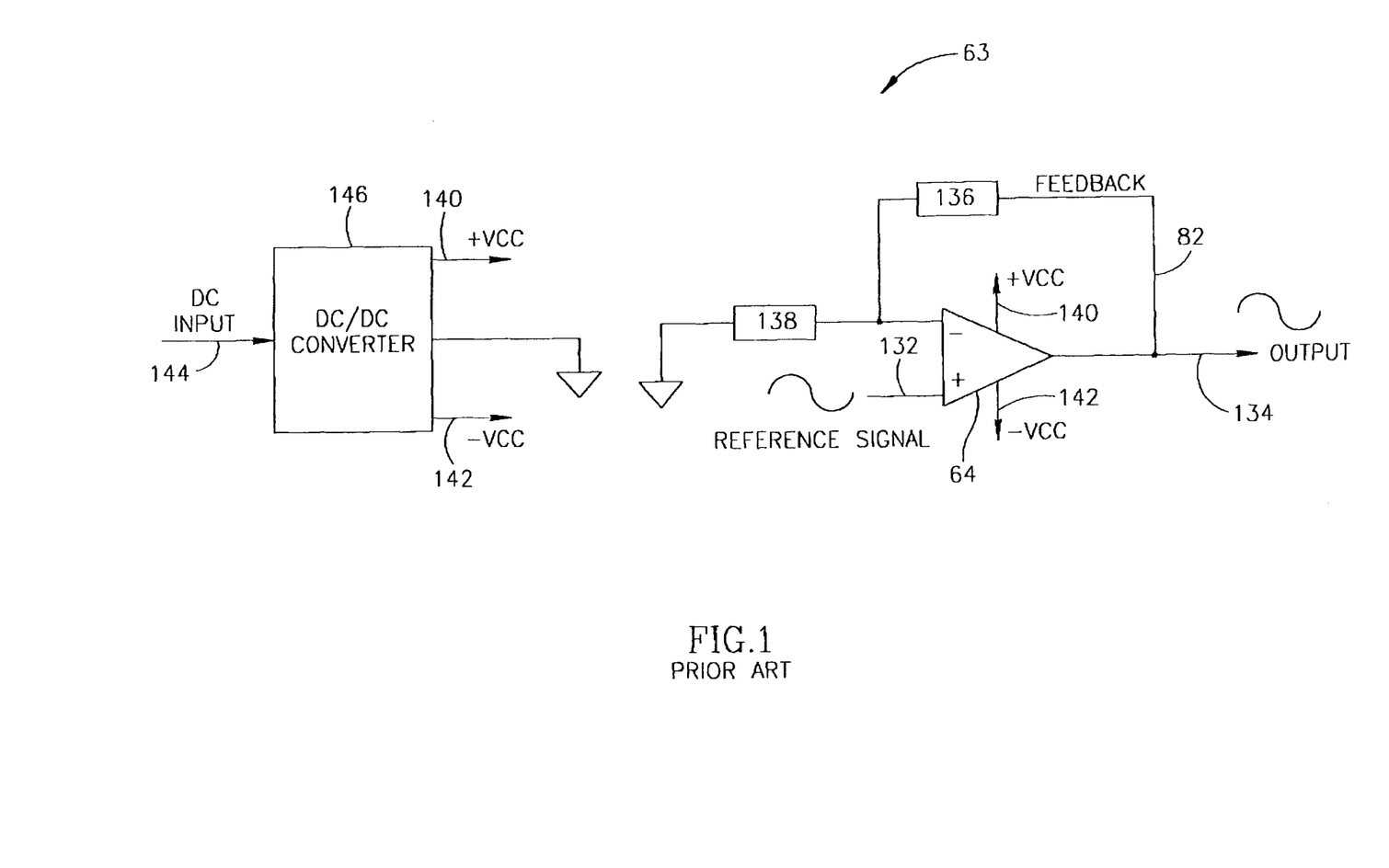
FIG. 1 is illustration of a prior art Class B linear amplifier fed by a DC/DC converter.

FIG. 1 shows one type of prior art apparatus 63 for generating a sine wave suitable for ringer. A linear amplifier 64 with output power stage of class B (according to a classification known to those skilled in the art) receives a reference signal 132 being a small accurate sine wave with a DC offset. The amplifier 64 compares the reference signal with a feedback signal 82 of an output 134. The gain of output 134, with respect to reference wave 132, is set by circuit elements 136 and 138. DC supply voltage outputs 140 and 142 are generated from the conversion of DC input 144 by a DC/DC converter 146. Chen (U.S. Pat. No. 5,600,713) describes an example of this type of generator. The apparatus 63 does contain a feedback, but it is power inefficient since 25% of its power is lost in the power stage due to the operation in the linear region that is typical for class B amplifiers.

Figure 2:
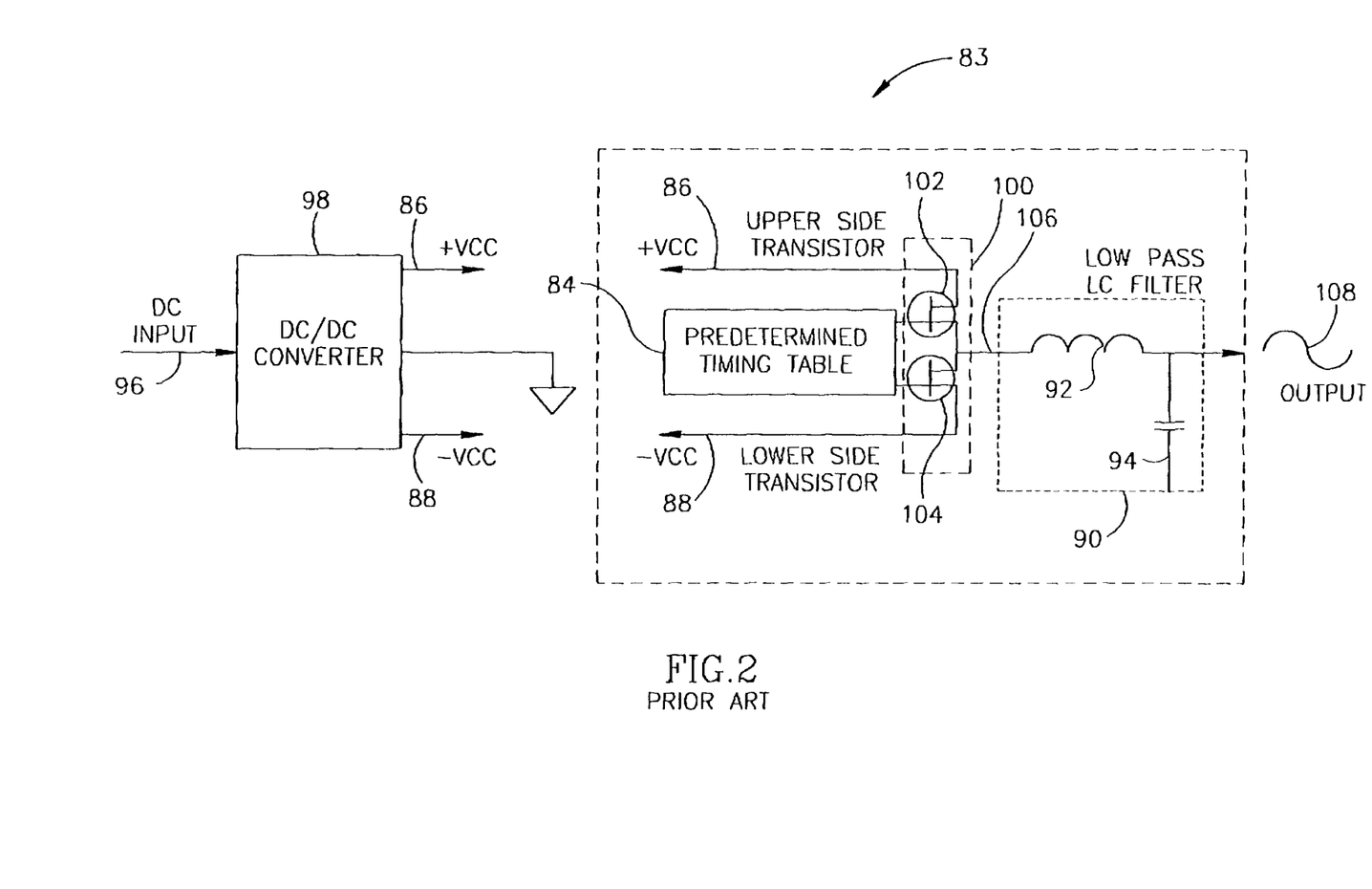
FIG. 2 is an illustration of a prior art Class D switching amplifier with a predetermined high frequency pulse train pulse width modulated by a sine wave and fed by a DC/DC converter.

FIG. 2 shows a second type of prior art apparatus for generating a sine wave suitable for a ringer, using a class D switching amplifier 100. An upper transistor 102 and a lower transistor 104 thereof switch on and off as in a conventional switching power supply, but at a fixed predetermined rate. Upper transistor 102 forms the positive part of the output sine wave 106, while the lower transistor forms its negative part. The output voltage 106 is filtered from high frequency components by a low pass L-C filter 90 containing inductance 92 and capacitance 94, to give a final output curve 108. The frequency and the form of the final output 108 (usually 20, 25 or 50 Hz) is determined by a predetermined timing table block 84. DC voltages 86 and 88, which are fed to a class D switching amplifier 100, determine the amplitude of final output 108. DC voltages 86 or 88 are generated from the conversion of DC input 96 by DC/DC converter 98. The apparatus 83 does not include a feedback loop to control the output signal, which is kept approximately sinusoidal by a predetermined timing table block 84.

Wendt (U.S. Pat. No. 5,307,407) illustrates a variation of the ringer of the second type which does include a feedback loop. The generation of output ringer signal is not, however, coupled to the generation of the power supply voltages, as the feedback loop only impacts the duty cycle of the switches of the ringer output and does not control the magnitude of the power supply voltages which are separately generated. The efficiency of each separately taken unit, namely the high voltage power supply and the ringer circuit, is high, but each unit inevitably contributes to reduce the overall efficiency. Additionally, there is an added expense and complexity in the combination of the two sets of switches.

Figure 3:
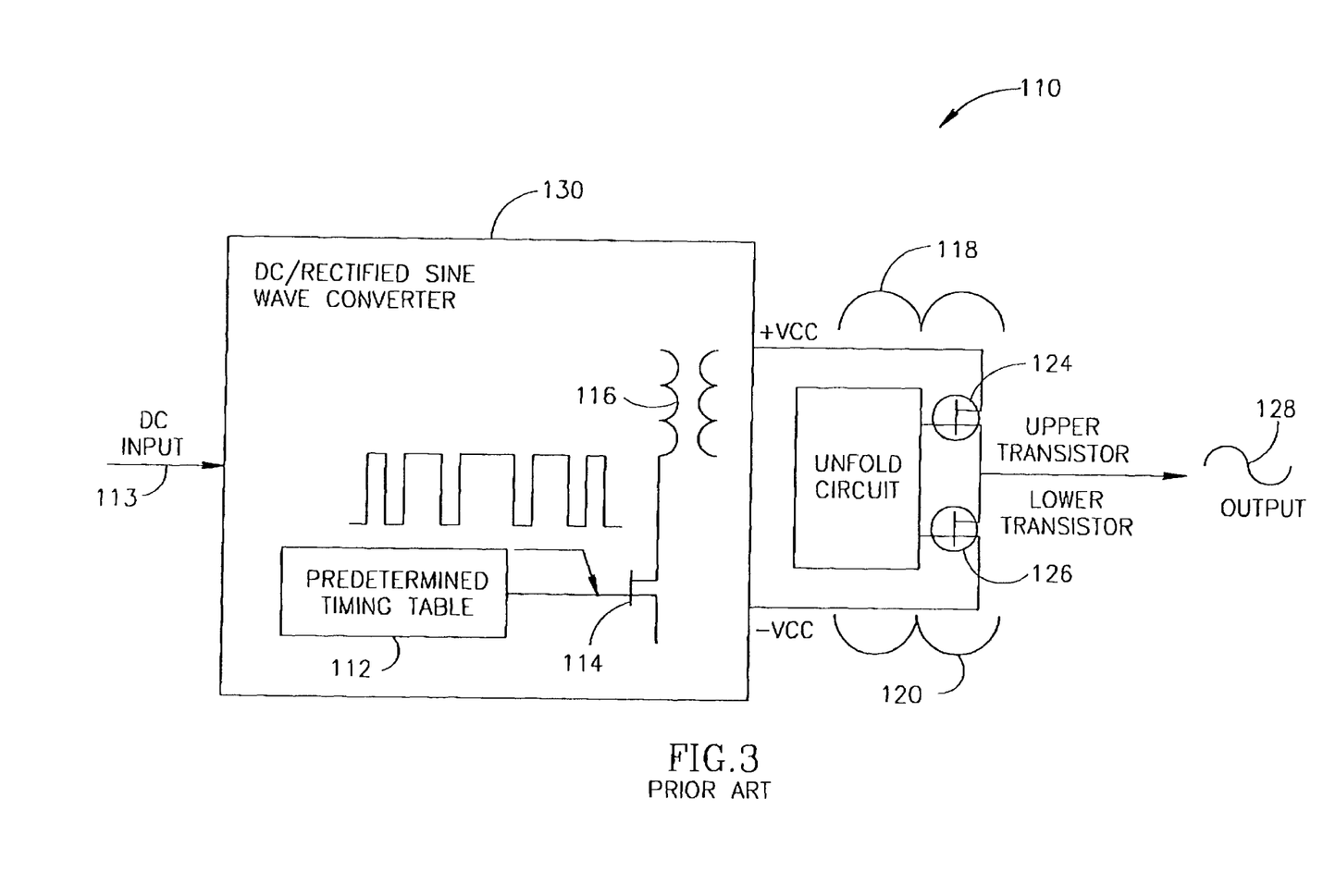
FIG. 3 is an illustration of a prior art DC to rectified sine wave converter with a predetermined high frequency pulse train pulse width controlled by a timing table.

FIG. 3 illustrates a third type of prior art apparatus 110 for generating a sine wave suitable for a ringer. A switch 114 is turned off and on by a predetermined timing table block 112, controlling the voltage applied to the transformer 116. The resulting power supply voltages 118 and 120 are in the form of full wave rectified sine waves generated by DC/rectified sine wave converter 130 from a DC input voltage 113. The form and frequency of supply voltages 118 and 120 are established by the predetermined timing table block 112, and the amplitude of these supply voltages is dependent on input voltage 113 and the output load current. Voltages 118 and 120 are unfolded into sine waves by means of an unfold circuit through output transistors 124 and 126 to give the output ringer signal 128. Apparatus 110 is more cost effective and efficient than apparatus 83 because it uses only one step of power conversion, however it does not include a feedback loop to control the output voltage 128, and the voltage is kept approximately sinusoidal by a predetermined timing table block 112.

There is thus a widely recognized need for, and it would be highly advantageous to have, a sine wave generator having minimal power loss, which integrates the generation and correction of the output signal and power supply voltages.

SUMMARY OF THE INVENTION

According to the present invention there is provided a method for generating an electrical signal of a required form, including the steps of: (a) generating at least one power supply voltage, (b) producing an output signal by a circuit powered by at least one power supply voltage, (c) producing a first feedback signal from the output signal, for adjusting the mentioned at least one power supply voltage and (d) adjusting the at least one power supply voltage using the first feedback signal.

According to the preferred embodiment, the output signal is generated by amplifying an input reference signal fed to said circuit.

In one particular version, the inventive method is applicable to generating a sine wave, for example with parameters suitable for a ringer in a telecommunication system.

Preferably, the method further includes steps of: (e) producing a second feedback signal from the output signal; (F) comparing the input reference signal with the second feedback signal; and (g) based on said comparison, correcting the output signal.

The output signal generated by amplifying the reference signal is therefore corrected through a second feedback loop. The amplitude of the power supply voltage is adjusted and corrected using a differential voltage feedback signal (the first feedback signal), dependent on a difference between the voltage amplitude of the power supply voltage(s) and the voltage amplitude of the output signal. To produce a correction signal, the differential voltage feedback signal is compared with a pre-selected DC reference level. This correction signal is used to control the duty cycle of a pulse stream from a PWM (Pulse Width Modulation) controller, causing the width of the pulses to vary with the amplitude of the correction signal. The pulse stream, in turn, controls the amplitude of the power supply voltage, generated preferably using a flyback converter, so that there is a minimal loss during the generation of the output ringer signal.

According to the present invention, there is also provided a device for generating an electrical signal of a required form, comprising: (a) an amplifier which produces an output signal, (b) a power supply generator for supplying at least one power supply voltage to the amplifier, and (c) a circuit for producing a first feedback signal based on the output signal, for controlling the at least one power supply voltage.

According to the preferred embodiment of the invention, the device is adapted to generate a sine wave suitable for a ringer in telecommunication systems.

The amplifier is preferably of class B and includes a comparison stage for comparing a reference signal with a (second) feedback signal from the output (ringer) signal. An output of the comparison stage drives an n-channel MOSFET (metal-oxide-semiconductor field effect transistor) and a p-channel MOSFET which are part of the power stage of the amplifier. These two transistors alternately conduct to form the output ringer signal.

In the preferred embodiment, the power supply generator includes a switching pulse width modulated (PWM) DC/DC converter, which converts an input DC voltage to a power supply voltage under control of the first feedback signal. The PWM DC/DC converter includes as its main components, a PWM controller which generates a pulse stream, a MOSFET transistor which is operated by the pulses in the pulse stream, and the center tap transformer whose primary (winding) is electrically connected to the drain of the MOSFET.

Preferably, the mechanism for producing the first feedback signal includes a differential voltage monitor for measuring the voltage drop across the alternately conducting MOSFET transistors of the power stage of the amplifier.

The present invention successfully addresses the shortcomings of the presently known configurations by being low cost, having minimal power loss, and integrating the generation and correction of the output signal and power supply voltages.

BRIEF DESCRIPTION OF THE DRAWINGS

The invention is herein described, by way of example only, with reference to the accompanying non-limiting drawings, wherein.

DESCRIPTION OF THE PREFERRED EMBODIMENTS

The present invention proposes a low cost generator of an electric signal (for example, of a sine wave suitable for a ringer) whose output signal and power supply voltages are correctable through two feedback loops. Specifically, the present invention enables reduction of power loss by adjusting the power supply voltages amplitude using feedback based on the actual output signal.

The principles and operation of a sine wave generator according to the present invention may be better understood with reference to the drawings and the accompanying description.

Figure 4A:
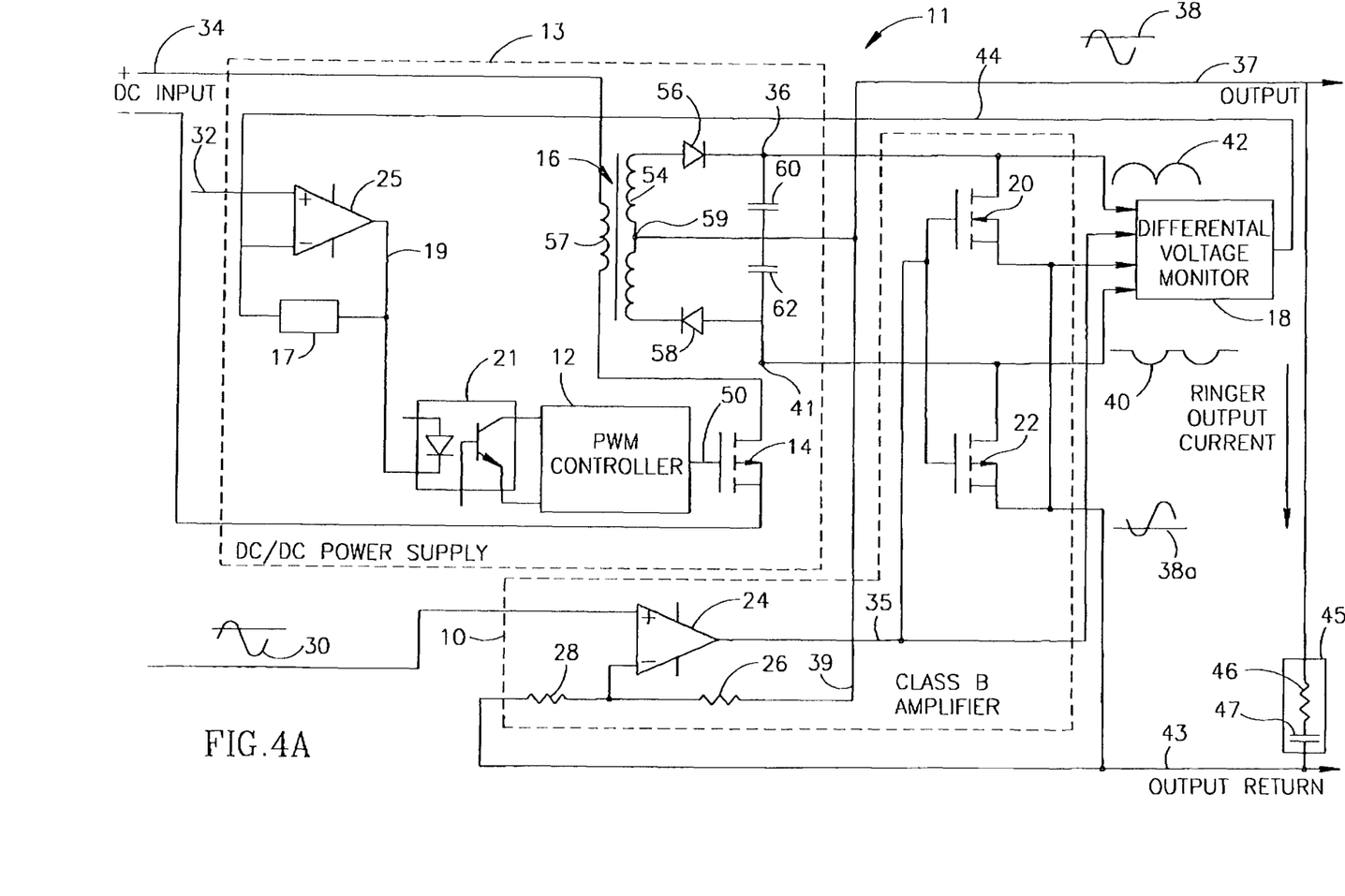
FIG. 4A is an illustration of a sine wave generator of the present invention.

Referring now to the drawings, FIG. 4A illustrates schematically a sine wave generator 11, wherein a low cost class B amplifier 10 is combined with a low cost DC/DC switching converter 13 and drives load 45 which consists of connected equipment such as telephones. Through a feedback signal 39, the output ringer signal 38 which is developed by class B amplifier 10 between the output rails 37 and 43, is compared with an input sinusoidal reference signal 30 and corrected. A differential voltage feedback signal 44, produced by a deferential voltage monitor 18, controls DC/DC switching converter 13, which generates power supply voltages 40 and 42. Because differential voltage feedback 44 is a function of the voltage amplitudes of power supply voltages 40 or 42 and the output ringer signal 38 (more particularly, its inverse signal 38a), converter 13 is forced to closely track the output voltage 38. Generation and correction of power voltages 40 and 42 and output ringer 38 are thus integrated, and as a result power losses in class B amplifier 10 are minimized.

The operation of class B amplifier 10 will now be detailed. A comparison stage 24 of class B amplifier 10 receives a small accurate sine wave reference signal 30 which includes a DC offset, and compares reference signal 30 with feedback 39 from output 38 of the power stage of class B amplifier 10. A voltage output 35 of comparison stage 24 is fed to the gates of two transistors, an upper transistor 20 and a lower transistor 22 which together constitute the power stage of class B amplifier 10. When output 35 of amplifier 24 is positive, upper transistor 20 conducts, and when output 35 of amplifier 24 is negative lower transistor 22 conducts. The conducting transistor 20 or 22 acts as a linear regulator while the non-conducting transistor 20 or 22 remains biased at cutoff. Output 38 of class B amplifier 10 is therefor a sine wave whose frequency and phase replicates that of reference sine wave 30 and whose voltage RMS amplitude and DC offset are obtained by multiplying reference sine wave 30 by the gain set by impedances 26 and 28.

In preferred embodiment of the present invention, upper transistor 20 is an n-channel power MOSFET, such as an IRFR220, whose drain is connected to a power supply source point 36, supplying positive power supply voltage 42, and whose source is connected to return 43. Lower transistor 22 is a p-channel MOSFET with the drain connected to the power source point 41 supplying negative power supply voltage 40, and whose source is also connected to return 43. It should be understood that in sine wave generator 11, converter 13 functions as power supply sources 36 and 41. Generally, transistors other than MOSFET can be used.

Load 45 consists of all units whose ringers will be activated by the output 38. These units are all connected in parallel, and is typically approximated by and equivalent to a resistor/capacitor combination, which is illustrated as resistor 46 and capacitor 47. Typical values for 1 American REN (Ringer Equivalent Network) are 7 kΩ for resistor 46 and 8 μF for capacitor 47. The return side of the scheme is shown as return 43.

The operation of switching converter 13 will now be detailed. Switching converter 13, uses a flyback transformer 16 and a PWM controller 12 to generate a DC output whose positive leg is 36, whose negative leg is 41, and whose center tap 59 is connected to output 37. DC input voltage 34, which is typically 48 volts DC, is fed to one side of the primary 57 of flyback transformer 16. The other side of primary 57 is connected to a switch 14, which is typically an n-channel power MOSFET, such as IRFR220. Switch 14 is controlled by the output of conventional low cost PWM controller unit such as a Unitrode UC2843A, which does not contain a timing table. The source of switch 14 is connected to the return of the DC input voltage which may be −48 volts DC. The secondary of flyback transformer 16 is center tapped, and the current is controlled by in line diodes 56 and 58 so as to only flow in one direction. Capacitor 60 is connected across the positive output leg 36 and center tap, and capacitor 62 is connected across the negative output leg 41 and the center tap, so as to maintain required voltages at the legs and smooth out the switching frequency ripples. During the "on" time of switch 14, current flows in the primary 57, but in neither part of the secondary 54. When switch 14 turns off, currents begin to flow through diodes 56 and 58 charging up output capacitors 60 and 62 to give respectively positive and negative power supply voltages 42 and 40, in relation to the center tap 59. When switch 14 turns on again, output capacitors 60 and 62 begin to discharge smoothing the changes in voltages 40 and 42. The value of output capacitor 60 is typically 0.33 μf, and that of capacitor 62 is typically 1 μf which is sufficient to handle a load of up to 5 American REN. Their actual values are chosen as a compromise between a necessity to perform low pass filtering of the switching frequency, and a need to minimize power dissipation associated with the fact that voltages on the capacitors change with output frequency. Different values are used, because the voltage swing across capacitor 60 is significantly greater than the voltage swing across capacitor 62, as will be further explained below.

The power loss of upper transistor 20 depends on the voltage difference between the voltage supplied at source 36 and the voltage at the return 43 during the conducting phase of the transistor. Both voltages are measured relative the center tap 59, and this is designated as a waveform 42 which will be further detailed below. During the non-conduction phase no current flows through transistor 20 and as a result no power is lost. Similarly, the power loss of power transistor 22 is derived from the voltage difference between the voltage supplied at source 41 and the voltage at return 43 during the conduction phase of transistor 22. Both voltages will be measured in relation to the center tap 59, and this is designated as a waveform 40 that will be further detailed below. Note that source 36 only supplies power when upper transistor 20 is conducting current and source 41 supplies power when lower transistor 22 is conducting current. Therefore each source only supplies power during half of the output current.

Power supply voltage waveforms 40 and 42 are maintained as follows. The amplitude of power supply voltages 40 and 42 is adjusted by differential voltage feedback signal 44. Differential voltage feedback signal 44 is the output of differential voltage monitor 18 which measures the voltage drop on sequentially conducting transistor 20 and 22 and thereby controls the supply voltage 40 to be slightly less than output voltage 38a during the operation period of transistor 22, and voltage 42 to be slightly greater than the output voltage 38a during the operation of transistor 20. The differential voltage across transistors 20 and 22 is maintained at about 2.5 V during the majority of the cycle, so as to minimize power while maintaining proper operation. The output 35 of amplifier 24 is fed as control input to differential voltage monitor 18, and is used to determine whether the difference between voltage 42 and voltage 38a, or that between voltage 40 and voltage 38a is to be feedback to the PWM controller 12.

We will now detail the operation of feedback signal 44, and its control of switching converter 13. Differential voltage feedback signal 44 is fed as a negative input to an error amplifier 25 equipped with a compensation circuit 17 which stabilizes the differential feedback loop. Error amplifier 25 compares feedback signal 44 to a DC reference signal 32 which is fed to the positive input. The resulting error signal 19 is fed to optocoupler 21 which is used for ground separation, and whose output transistor is connected to the negative input of an error amplifier (not shown) built in the PWM controller 12. As feedback signal rises above the fixed DC reference signal, the duty cycle of the output pulse train of PWM controller 12 is decreased, which decreases the on time of the switch 14. Decreasing the on time of switch 14, decreases the power transferred to the secondary of flyback transformer 16, which acts to decrease the output voltages 40 and 42. It should be noted that the value of the desired DC offset of the output signal 38 defines whether one or two power supply voltages should be generated. If the desired DC offset shifts the output signal 38 to be either completely positive or completely negative, only one power supply voltage will actually be needed to feed power stage of amplifier 10. However, it should be appreciated that a bipolar output signal may also be obtained using only one power supply voltage, if some additional arrangements are implemented.

Figure 4B:
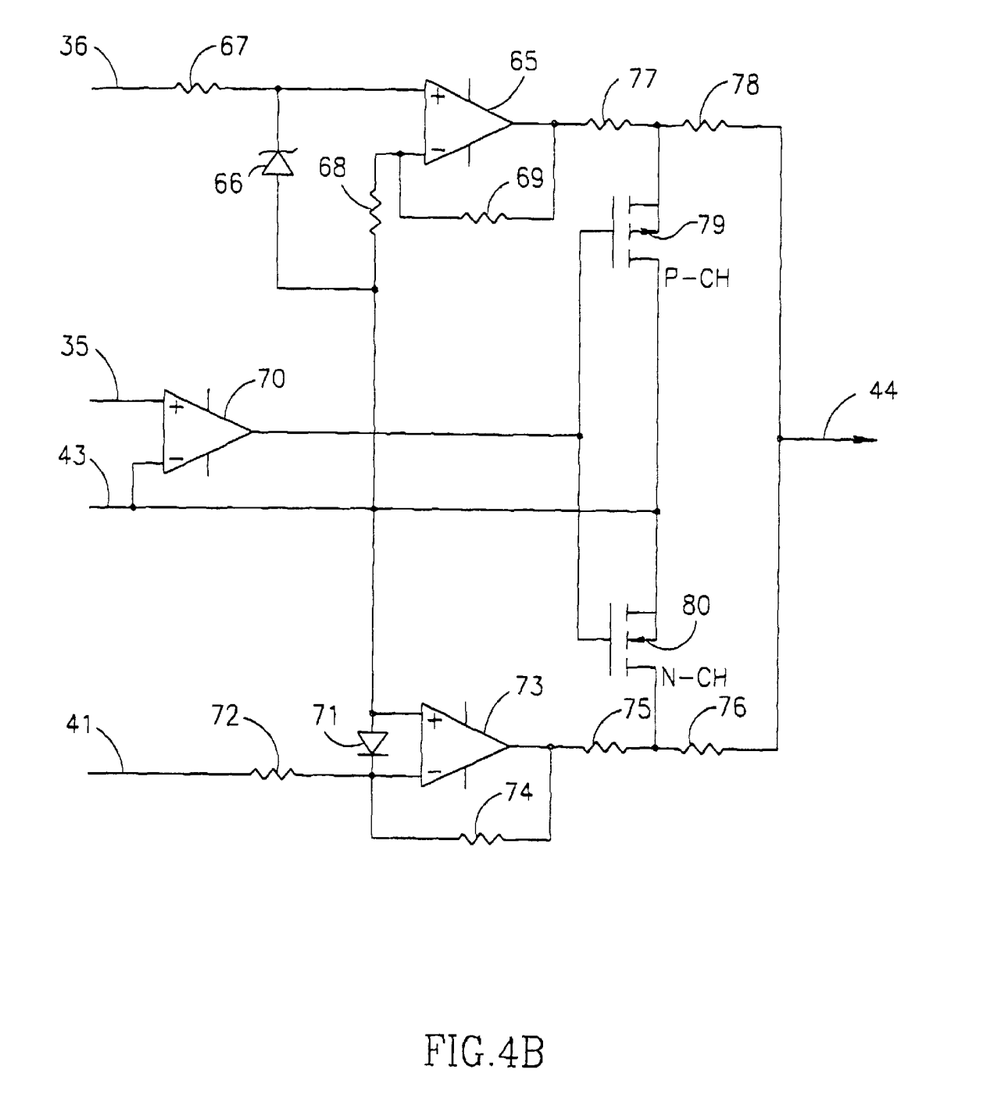
FIG. 4B is a block diagram of the Differential voltage monitor.

Referring now to FIG. 4B, we will now detail the operation of the differential voltage monitor 18. As mentioned above, the monitor function to pass sequentially the difference between voltage 42 and voltage 38a, or the difference between voltage 40 and voltage 38a. An output of the amplifier that is to be ignored at the time, is connected by a corresponding MOSFET to the return 43, thus being effectively grounded. Amplifier 65 passes the difference in voltage between point 36 and point 43 (return), and amplifier 73 passes the difference in voltage between point 41 and point 43 with a gain of 3 set by elements 69 and 68 for amplifier 65 and elements 74 and 72 for amplifier 73. The input voltage to amplifier 65 is clipped by Zener diode 66 to prevent improper operation of amplifier 65 in case that the voltage between rails 36 and 43 is out of range. Amplifier 70 receives signal 35 and acts as a comparator of signal 35 to signal 43. If signal 35 is positive in relation to signal 43, the output of amplifier 70 is positive, turning on n-channel MOSFET 80 and as a result the junction of elements 76 and 75 is effectively connected to return 43, and turning off p-channel MOSFET 79. With p-channel MOSFET 79 shut off, the output of amplifier 65 is passed to output 44 via a voltage divider network consisting of elements 77, 78 and 76. The voltage divider network divides the voltage by 3, effectively bringing the output 44 to equal the differential voltage, being however limited by the supply rails of amplifier 65, prior to the voltage divider. If signal 35 is negative in relation to signal 43, the output of amplifier 70 is negative, turning off n-channel MOSFET 80, and turning on p-channel MOSFET 79. The balance of the operation is as set forth above, and therefor will not be detailed, with the only difference being that diode 71 acts as limit of 0.6 volts since voltage 41 is negative with respect to voltage 43 and amplifier 73 is set to act as an inverter since the input voltage at point 41 is negative.

Figure 5A:
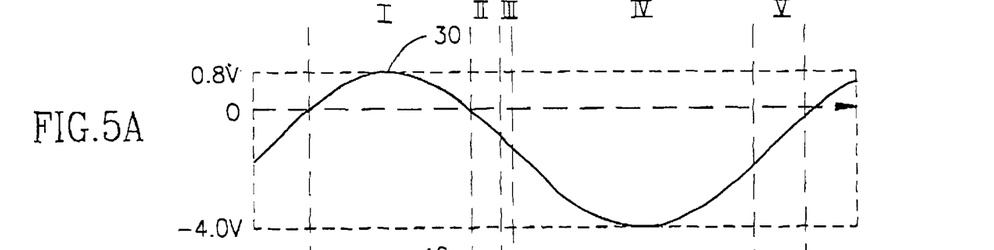
FIG. 5A is a time chart of the input reference signal.
Figure 5B:
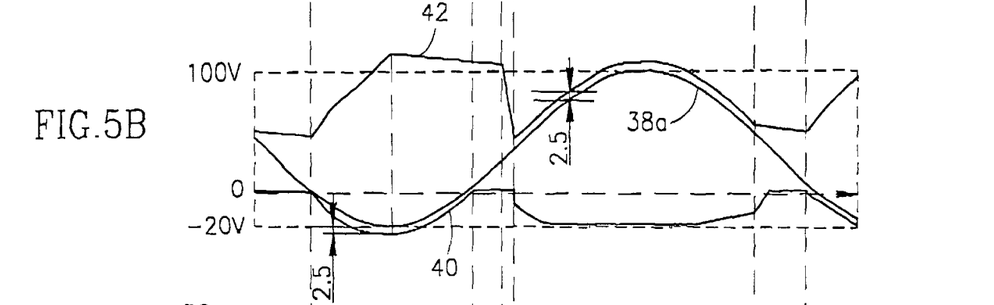
FIG. 5B is a time chart of the power supply voltages and the output voltage.

Referring now to FIG. 4A, the operation of sine wave generator 11 will be detailed with reference to the waveforms shown in FIG. 5. For illustration purposes, reference wave 30 which is input to amplifier 24 of class B amplifier 10 is assumed to be a 20 Hz sine wave, with a peak to peak amplitude of 4.8 V and a DC offset −1.6 V relative to return 43. The gain of output 38 with respect to reference wave 30 is set to 25 by circuit elements 26 and 28, using as a non limiting example 250 kΩ for element 26 and 10 kΩ for elements 28. Output 38 of class B amplifier 10 is therefore controlled to be a 20 Hz sine wave, with a peak to peak amplitude of +/−60 volts (60/√2=42 volts RMS) and a DC offset of −40 volts. FIG. 5B shows waveform 38a, which is the mirror image of waveform 38 around the time axis, and thus has an offset of +40 volts. Waveform 38a which is the voltage of the return 43 with reference to center tap 59, is utilized in place of waveform 38 for convenience in explanation. All other illustrated waveforms are also considered relative to center tap 59, which is connected to output 37. As mentioned above, the voltage drop across MOSFET 20 and 22 in operation must be about 2.5 volts, and thus the peak level required for power supply voltage 40 is −22.5 V. The peak level for power supply voltage 42 is required to be +102.5 volts which corresponds to the maximum negative swing of output signal 38a with a 2.5 V differential at the peak value.

Figure 5C:
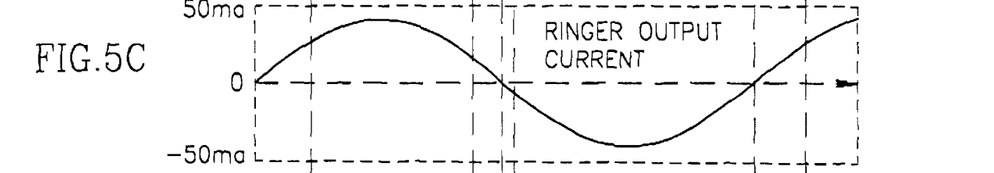
FIG. 5C is a time chart of the output current.
Figure 5D:
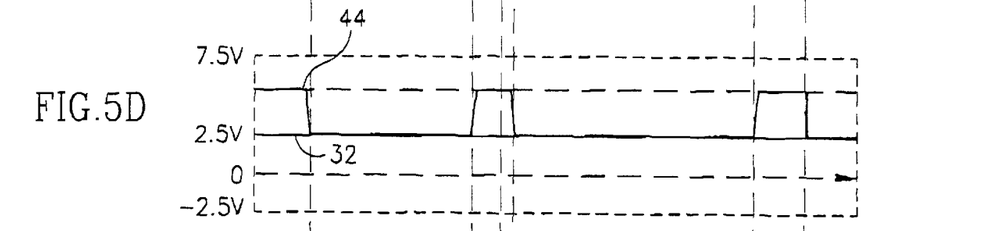
FIG. 5D is a time chart of the differential feedback voltage and the DC reference signal.
Figure 5E:
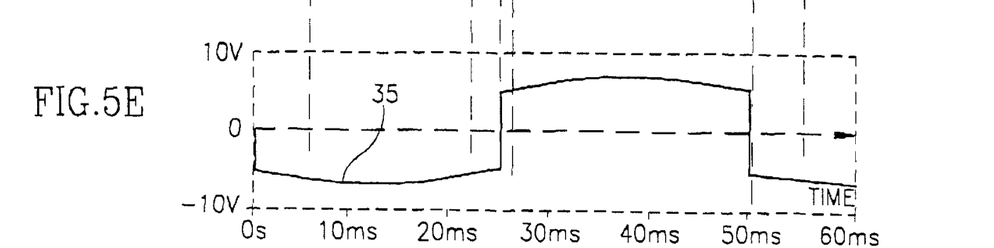
FIG. 5E is a time chart of the output voltage of amplifier 24.

Referring again to FIG. 5B, the positive power supply voltage 42 and the negative power supply voltage 40 are graphed, while in FIG. 5C, we find the current flow which is being output to load 45. The waveform of FIG. 5C matches the waveform of the reference voltage shown in FIG. 5A and, consequently, the waveform 38 which is not shown. FIG. 5D shows the waveform of a differential feedback signal 44, and the DC reference signal 32. FIG. 5E shows the output 35 of amplifier 24 which is used to both control transistors 20 and 22, as well as to select on which MOSFET the voltage drop is to be monitored by differential voltages monitor 18.

Referring back to FIG. 4A, operation of the device will now be described with the aid of FIGS. 5A to 5E. During time period I, transistor 22 is operating, and current is supplied by converter 13 and flows from the center tap 59 through output leg 37 to load 45, and returns via output return leg 43 through transistor 22 to converter output leg 41. Voltage on capacitor 62 changes according to output 38a, while capacitor 60 charges up to its maximum value, since no current is flowing in the positive leg. Feedback signal 44 is operative to control the duty cycle of PWM controller 12 to maintain power supply voltage 40 at the negative differential of 2.5 volts to the output voltage 38a. Positive voltage 42 reaches its highest value and remains at it since nearly no discharge path for capacitor 60 is provided. Referring now to period II, voltage 40 which can not become more positive than +0.6 volts due to the forward bias of diode 58 ceases to track output 38a. The feedback voltage signal 44 begins to increase until is clipped at its maximum value by the differential voltage monitor 18, however as explained above power supply voltage 40 remains at approximately zero. The feedback voltage 44 acts on PWM controller 12 to reduce the duty cycle virtually to zero, as no additional energy in the form of voltage is required at the time for maintaining the operating conditions. The positive voltage 42 remains near its peak since no effective discharge path is provided via the capacitance load component 47; the capacitive element 47 discharges via transistor 22 conductance of which is decreased by the operation of signal 35; less current flows across resistor 46, and the voltage 38a rises to +40 Volts, at which point the current becomes zero. At this particular point both MOSFET's are closed, since no current is transferred to load. Referring now to period III, further decreasing of reference signal 30 enforces output 35 of amplifier 24 to become positive, driving transistor 20 into linear region to create the negative part of the output current cycle. Capacitor 60 rapidly discharges through transistor 20 until positive supply voltage 42 is 2.5 volts above output voltage 38a. Change in the output 35 of amplifier 24 is sensed by differential voltage monitor 18, forcing it to monitor voltage 42, and ignore voltage 40. As soon as positive supply voltage 42 is 2.5 Volts above output voltage 38a, the output 44 of differential voltage monitor 18 falls towards its DC reference value, thus operating to increase the duty cycle of PWM controller 12 again.

During time period IV, transistor 20 continues to operate, and current is supplied by converter 13 and flows from the output leg 36 through transistor 20 to output return 43 via load 45, and then returns through output leg 37 to center tap 59. Voltage on capacitor 60 changes according to output 38a while capacitor 62 charges up to its maximum negative value, since no current is flowing in the negative leg. Feedback signal 44 is operative to control the duty cycle of PWM controller 12 to maintain power supply voltage 42 to be 2.5 volts above output voltage 38a. Negative voltage 40 reaches its highest negative value and remains at it since nearly no discharge path for capacitor 62 is provided. At the end of period IV, output current becomes zero. At this particular point both MOSFET's are closed, since no current is transferred to load. Referring to time period V, further increase of reference signal 30 causes output 35 of amplifier 24 to become negative, driving transistor 22 into linear region to create the positive part of the output current cycle. Change in the output 35 of amplifier 24 is sensed by differential voltage monitor 18, forcing it to monitor voltage 40, and ignore voltage 42. As voltage 40 during that time is negative decreasing to zero, while output 38a is still positive, the feedback voltage signal 44 begins to increase until is clipped at its maximum value by the differential voltage monitor 18, however as explained above power supply voltage 40 decreases and remains at approximately zero. The feedback voltage 44 acts on PWM controller 12 to reduce the duty cycle virtually to zero, as no additional energy in the form of voltage is required at the time for maintaining the operating conditions. The positive voltage 42 remains near value at which it was left at the end of period IV, since transistor 20 is closed and no effective discharge path is provided via the capacitance load component 47; the capacitive element 47 discharges via transistor 22 conductance of which is decreased by the operation of signal 35; more current flows across resistor 46, and the voltage 38a decreases to zero volts and crosses it, at which point voltage 40 starts to track output 38a as described above in time period I.

What is claimed is:
1. A method for generating an electrical signal of a required form, comprising the steps of:
  (a) generating at least one power supply voltage,
  (b) producing an output signal by a circuit powered by said at least one power supply voltage by amplifying an input reference signal fed to said circuit;

(c) producing a first feedback signal, based on said output signal for adjusting said at least one power supply voltage;

(d) adjusting said at least one power supply voltage using the first feedback signal;

(e) producing a second feedback signal from the output signal;

(f) comparing said input reference signal with said second feedback signal; and (g) based on the comparison provided at step (f), correcting said output signal.

2. The method according to claim 1, wherein said output signal is a sine wave suitable for a ringer in telecommunication equipment.

3. The method of claim 1, wherein the step of generating the power supply voltage is effected using a flyback converter.

4. The method of claim 1, wherein said step of adjusting comprises comparing said first feedback signal with a DC reference voltage signal.

5. A method for generating an electrical signal of a required form, comprising the steps of:

(a) generating at least one power supply voltage, (b) producing an output signal by a circuit powered by said at least one power supply voltage by amplifying an input reference signal fed to said circuit;

(c) producing a first feedback signal, based on said output signal for adjusting said at least one power supply voltage; and (d) adjusting said at least one power supply voltage using the first feedback signal,
wherein said first feedback signal is a differential voltage feedback signal, dependent on a relationship between a voltage amplitude of said at least one power supply voltage and a voltage amplitude of said output signal.

6. A device for generating an electrical signal of a required form, comprising:

(a) an amplifier for producing an output signal of a required form, (b) a power supply generator for supplying at least one power supply voltage to said amplifier; and (c) a circuit for producing a first feedback signal to control said at least one power supply voltage based on said output signal,
wherein said amplifier further includes:
(i) a comparison stage for comparing a reference input signal with a second feedback signal taken from said output signal, and
(ii) a power stage for producing said output signal based on an output from said comparison stage.

7. The device according to claim 6, adapted to produce the output signal in the form of a sine wave suitable for a ringer.

8. The device of claim 7, wherein said power stage comprises two transistors, alternately conducting to form said output signal.

9. The device of claim 8, wherein one of said transistors is an n-channel MOSFET and another said transistor is a p-channel MOSFET.

10. The device of claim 8, wherein said circuit for producing said first feedback signal includes a differential voltage monitor for measuring a voltage drop across each of said alternately conducting transistors.

11. The device of claim 6, wherein said amplifier is a class B amplifier.

12. The device of claim 6, wherein said power supply generator includes a switching PWM DC/DC converter, whose duty cycle is controlled by said first feedback signal.

13. The device of claim 12, wherein said switching PWM DC/DC converter comprises:

(i) a PWM controller for generating a stream of pulses, (ii) a MOSFET transistor having a drain controlled by widths of pulses in the stream generated by said PWM controlled, and (iii) a center tapped transformer having a primary thereof connected electrically to said drain of said MOSFET transistor.

14. The method according to claim 5 wherein the step of producing the output signal comprises amplifying an input reference signal fed to said circuit.

15. A device for generating an electrical signal of a required form, comprising:

(a) an amplifier for producing an output signal of a required form, (b) a power supply generator for supplying at least one power supply voltage to said amplifier;

(c) a power stage for producing said output signal, comprising two transistors, alternately conducting to form said output signal; and (d) a circuit for producing a first feedback signal to control said at least one power supply voltage based on said output signal,
wherein said circuit for producing said first feedback signal includes a differential voltage monitor for measuring a voltage drop across each of said alternately conducting transistors.

16. The device of claim 15, wherein one of said transistors is an n-channel MOSFET and another said transistor is a p-channel MOSFET.

* * * * *